US009930608B2

(12) United States Patent
Braga Ameixieira

(10) Patent No.: US 9,930,608 B2
(45) Date of Patent: Mar. 27, 2018

(54) METHOD AND SYSTEM FOR OPERATING A VEHICULAR DATA NETWORK BASED ON A LAYER-2 PERIODIC FRAME BROADCAST, IN PARTICULAR A ROUTING PROTOCOL

(71) Applicant: VENIAM INC., Mountain View, CA (US)

(72) Inventor: Carlos Eduardo Braga Ameixieira, Porto (PT)

(73) Assignee: VENIAM INC., Mountain View, CA (US)

( * ) Notice: Subject to any disclaimer, the term of this patent is extended or adjusted under 35 U.S.C. 154(b) by 0 days.

(21) Appl. No.: 15/534,705

(22) PCT Filed: Feb. 29, 2016

(86) PCT No.: PCT/IB2016/051112
§ 371 (c)(1),
(2) Date: Jun. 9, 2017

(87) PCT Pub. No.: WO2016/135711
PCT Pub. Date: Sep. 1, 2016

(65) Prior Publication Data
US 2017/0374601 A1    Dec. 28, 2017

Related U.S. Application Data

(60) Provisional application No. 62/121,655, filed on Feb. 27, 2015.

(51) Int. Cl.
*H04W 40/30* (2009.01)
*H04W 40/24* (2009.01)
(Continued)

(52) U.S. Cl.
CPC ......... *H04W 40/30* (2013.01); *H04L 61/6086* (2013.01); *H04L 69/324* (2013.01);
(Continued)

(58) Field of Classification Search
None
See application file for complete search history.

(56) References Cited

U.S. PATENT DOCUMENTS 7,848,278 B2 * 12/2010 Chen ................ H04B 7/2606
370/328
7,891,004 B1    2/2011 Gelvin
(Continued)

FOREIGN PATENT DOCUMENTS

WO    WO 2015/019234 A1    2/2015

OTHER PUBLICATIONS

IEEE Standard for Wireless Access in Vehicular Environments (WAVE)—Networking Services, IEEE Std 1609.3, 2016.*
(Continued)

*Primary Examiner* — Ayaz Sheikh
*Assistant Examiner* — Faiyazkhan Ghafoerkhan
(74) *Attorney, Agent, or Firm* — Leason Ellis LLP

(57) ABSTRACT

Method for operating a network node of a wireless digital data network based on broadcast layer-2 periodic frames, wherein said network is composed by a plurality of network nodes, wherein each network node is either a mobile node equipped with an on-board unit (OBU) node, or is a static node equipped with a road-side unit (RSU) node, said method comprising a current network node of the plurality of network nodes carrying out the following steps: periodically broadcasting a Network Status Information (NSI) frame which comprises: the node identifier and a type of node of the current network node; receiving broadcasted NSI frames from neighboring network nodes of the plurality of network nodes reachable by the current network node through wireless communication; for any one received NSI frame, storing the received NSI frame in an entry in a NSI table (NSIT) if the received NSI frame was the first received
(Continued)

NSI frame from a neighboring network node, or otherwise, if the received NSI frame was not the first received NSI frame from the neighboring network node, updating a previously stored NSIT entry with the received NSI frame; marking as expired or deleting any previously entered NSIT entry after a predetermined period of time has passed after receiving or updating said any previously entered NSIT entry. Also an electronic network node of a wireless digital data network, wherein said network node is programmed to carry out the method.

21 Claims, 8 Drawing Sheets

(51) Int. Cl.
*H04L 29/12* (2006.01)
*H04L 29/08* (2006.01)
*H04W 84/18* (2009.01)

(52) U.S. Cl.
CPC ....... *H04W 40/242* (2013.01); *H04W 40/244* (2013.01); *H04W 40/248* (2013.01); *H04W 84/18* (2013.01)

(56) References Cited

U.S. PATENT DOCUMENTS

| | | | | |
|---|---|---|---|---|
| 8,520,673 | B2* | 8/2013 | Chen | H04L 45/16 370/312 |
| 9,686,124 | B2* | 6/2017 | Ameixiera | H04L 41/048 |
| 9,826,499 | B2* | 11/2017 | Han | H04W 64/006 |
| 2008/0095134 | A1* | 4/2008 | Chen | H04B 7/2606 370/342 |
| 2008/0095163 | A1* | 4/2008 | Chen | H04L 45/16 370/392 |
| 2009/0088924 | A1* | 4/2009 | Coffee | B28C 5/422 701/31.4 |
| 2011/0268013 | A1 | 11/2011 | Levendel et al. | |
| 2012/0093091 | A1* | 4/2012 | Kang | H04W 4/22 370/329 |
| 2012/0320881 | A1* | 12/2012 | Hong | H04B 7/2646 370/336 |
| 2013/0069829 | A1* | 3/2013 | Smely | G01S 11/10 342/458 |
| 2013/0072121 | A1* | 3/2013 | Smely | H04W 16/14 455/41.2 |
| 2013/0084890 | A1* | 4/2013 | Smely | G01S 11/10 455/456.1 |
| 2013/0102352 | A1* | 4/2013 | Mintah | H04L 45/04 455/519 |
| 2013/0234892 | A1* | 9/2013 | Povolny | G01S 1/02 342/386 |
| 2013/0315099 | A1* | 11/2013 | Chen | H04L 45/16 370/254 |
| 2013/0342368 | A1 | 12/2013 | Nathanson | |
| 2014/0081718 | A1* | 3/2014 | Leopold | G07B 15/02 705/13 |
| 2014/0081848 | A1* | 3/2014 | Leopold | G06Q 20/327 705/39 |
| 2015/0312883 | A1* | 10/2015 | Han | H04H 20/62 370/328 |
| 2016/0198466 | A1* | 7/2016 | Yang | H04W 4/06 370/331 |

OTHER PUBLICATIONS

"IEEE Standard for Wireless Access in Vehicular Environments (WAVE)—Networking Services" IEEE Std 1609.3-2010 (Revision of IEEE Std 1609.3-2007), Dec. 30, 2010.

D. Harinath, "OSI Reference Model—A Seven Layered Architecture of OSI Model"—International Journal of Advanced Research in Computer Science and Software Engineering, vol. 3, No. 8, Aug. 2013.

Carlos Ameixieira et. al. "An IEEE 802.11 p/WAVE implementation with synchronous channel switching for seamless dual-channel access. In Vehicular Networking Conference (VNC)", 2011 IEEE, pp. 214-221. IEEE, 2011.

Carlos Ameixieira, et. asl,"Harbornet: A real-world testbed for vehicular networks," Dec. 2013.

Ana Maria Orozco et al. "Routing Protocols simulation for efficiency Applications in Vehicular Environments", Sistemas y Telematica, vol. 11, No. 27 2013, pp. 27-42.

* cited by examiner

METHOD AND SYSTEM FOR OPERATING A VEHICULAR DATA NETWORK BASED ON A LAYER-2 PERIODIC FRAME BROADCAST, IN PARTICULAR A ROUTING PROTOCOL

CROSS-REFERENCE TO RELATED APPLICATIONS

This application is a U.S. National Stage Application under 35 U.S.C. § 371 of International Patent Application No. PCT/IB2015/051112, filed Feb. 29, 2016 which claims priority to U.S. Provisional Application No. 62/121,655, filed Feb. 27, 2015, which are hereby incorporated by reference as is set forth in their respective entireties herein.

TECHNICAL FIELD

The present disclosure relates to a novel routing method particularly adapted for use with vehicular networks, where multi-hop communication between two nodes are possible after the nodes involved have shared their information, enabling the definition of the routing path based on the service characteristics and layer-2 frames.

BACKGROUND

Until today there is no routing approach described in any of the IEEE standards regarding vehicular communications. The present disclosure provides a mechanism to overcome this network requirement. Although the IPv6 configuration is specified at section 6.5 of IEEE Std 1609.3-2010 [1], no routing protocol is discussed in the standard, and no IPv4 configuration is even mentioned. IEEE Std 1609.3-2010 [1] specifies that each provider advertising a service should be able to configure its IPv6 based on the information received in the WaveRoutingAdvertisement of a WAVE Service Advertisement (WSA), in an one-way communication between nodes within the network. These facts are disclosed in order to illustrate the technical problem addressed by the present disclosure.

SUMMARY

Vehicular environments present rapid topology changes which makes multi-hop data delivery a challenging task. Service Based layer-2 Routing Protocol (SB2RP) is a presently disclosed routing protocol defined herein as a simple, yet fast and efficient, solution to provide multi-hop packet forwarding in a vehicular environment.

In contrast to the prior art, the present disclosure in particular specifies a protocol where all nodes can share information within the network, being able to perform IPv4 and IPv6 routing.

As described in IEEE Std 1609.3-2010 [1], a service is identified by its Provider Service Identifier (PSID) and a provider must indicate its Provider Service Context (PSC), used to provide short information about the service being offered, where its format depends on the PSID. A user is one that acts on the receipt of a Wireless Access in Vehicular Environments (WAVE) Service Advertisement (WSA). The PSC is sent as part of the WSA broadcast frame, so each node receiving it can evaluate its information. Since WSAs are only sent by providers, an user has no way to communicate with its provider, unable to share valuable information about its status, allowing its provider to know, among other things, its location. Overcoming this problem, the Node Status Information (NSI) frame was created.

In one aspect, in general, a method for routing in a network, and in particular in a mobile vehicular network, makes use of a method in which each nodes tries to find an uplink via a gateway with internet connectivity. The selection of a gateway is generally made by the mobile node to avoid connecting to a gateway that does not have direct, or at least indirect, connectivity to the Internet. The selection makes use of parameters that are not available at the data link layer (layer 2) of the networking protocol, at which decisions regarding link-level connectivity are made. Once the mobile node has established connectivity via the selected gateway, routing is relatively simple because there are not alternative routes that have to be maintained at the network layer (layer 3). Furthermore, changes in connectivity can be reacted to more efficiently and/or more quickly with using information exchanged at layer 2 (e.g., in NSI packets) as compared to relying exclusively on network layer (layer 3) routing protocols to accommodate the connectively changes. In at least some embodiments, for each node, a list of children nodes is sent so that each node knows its own descendants and can route to the right child node when receiving a packet for a grandchild node. An advantage of the implementation at the data link layer is that the constant changes in topology and connectivity in vehicle nodes, can be reacted to very quickly to maintain efficient operation of the network. Using the data maintained layer 2 on a mobile node, the process of selecting the uplink of a node is also informed, by the table obtained by the NSI's, so as not to choose one of its own children or grandchildren as an uplink, thereby avoiding loops.

As an example described in more detail in the Description below, nodes 706 and 705 can reach each other but have chosen node 704 as its gateway. Even though they can reach each other, their IPRT has no route for each other, since one is not part of the chain of the other. The approach only logs and uses descendant nodes. The approach thereby saves processing resources and memory, avoiding loops and unnecessary effort from the routing protocol, automatically ensuring a tree topology (by propagation of the routing information contained in the NSI frames). Although the approach may not be suitable for all networking environments, it is well suited to the characteristics of a mobile vehicle network with rapidly changing connectivity.

Furthermore, of note is that, according to the governing communication standards, normally only service providers initiate the provision of a routing service. In the approach described above, all nodes can participate in routing, which has the potential of providing improved connectivity. In particular, a solution provided in the Description is to get service USERS to also provide NSI messages and routing (see FIG. 3), thus a user may signal a service request USR for providing NSI messages and routing (denoted by the ACPSID in the USR).

Furthermore, with NSI broadcasting occurring asynchronously to the uplink selection decision (i.e. selecting from the neighbouring network nodes an uplink network node that has an uplink connection to an upstream network), this allows a more fluid and lightweight routing method.

For example, a current node propagates upward (uplink direction) the information regarding the nodes that are present downwards connected to the current node (linked node list). This information, when changed, does not need to propagate to the whole network. When a node or nodes change uplink connections, then new linked node lists are usually necessary to be updated and propagated. As the updated linked node list flows upwards, it usually reaches an upper node where the linked node list is the same as before the change. From this point, it is no longer necessary to update the linked node list. More, as this information propagates concurrently to the uplink selection, it propagates with little processing effort over the network.

In another aspect, it is disclosed a method for operating a network node of a wireless digital data network based on broadcast layer-2 periodic frames, wherein said network is composed by a plurality of such network nodes, wherein any such network node is either a mobile node equipped with an on-board unit, OBU node, or is a static node equipped with a road-side unit, RSU node, said method comprising the current network node carrying out the following steps:

periodically broadcasting a layer-2 frame, herewith NSI frame, which comprises: the node identifier and the type of node of the current network node;

receiving broadcasted NSI frames from the network nodes reachable by the current network node through wireless communication, herewith neighbouring network nodes;

for each received NSI frame, storing the received NSI frame in an entry in a NSI table, herewith NSIT, if the received NSI frame was the first received NSI frame from a neighbouring network node; or otherwise, if the received NSI frame was not the first received NSI frame from the neighbouring network node, updating the previously stored NSIT entry with the received NSI frame;

marking as expired or deleting any previously entered NSIT entry after a predetermined period of time has passed after receiving or updating said any previously entered NSIT entry.

In another aspect, it is disclosed a method for operating a network node of a wireless digital data network based on broadcast layer-2 periodic frames, for routing data packets in said wireless digital data network, wherein said network is composed by a plurality of network nodes, wherein each network node is either a mobile node equipped with an on-board unit (OBU) node, or is a static node equipped with a road-side unit (RSU) node, said method comprising a current network node of the plurality of network nodes carrying out the following steps:

periodically broadcasting a layer-2 Network Status Information (NSI) frame which comprises: a node identifier of the current network node and a type of node of the current network node;

receiving broadcasted NSI frames from neighbouring network nodes of the plurality of network nodes reachable by the current network node through wireless communication;

for each received NSI frame, storing the received NSI frame in an entry in a NSI table (NSIT) if the received NSI frame was the first received NSI frame from a neighbouring network node, or otherwise, if the received NSI frame was not the first received NSI frame from the neighbouring network node, updating a previously stored NSIT entry with the received NSI frame;

marking as expired or deleting any previously entered NSIT entry after a predetermined period of time has passed after receiving or updating said any previously entered NSIT entry;

wherein said NSI frame further comprises routing data which comprises a node identifier and the IP address of the uplink network node for a node broadcasting said NSI frame, and comprises a list of the identifiers and IP addresses of the network nodes that are connected to the uplink network through the node broadcasting said NSI frame, herewith mentioned as linked node list.

In another aspect, it is disclosed a method, wherein said method is used for routing data packets in said wireless digital data network, said method comprising the current network node further carrying out the following steps:

selecting from the neighbouring network nodes an uplink network node that has an uplink connection to an upstream network;

establishing an uplink wireless connection to said uplink network node;

setting a default IP gateway entry in an IP Routing Table (IPRT) to an IP address of the uplink network node;

making available the entries of the IPRT for routing by the current network node;

said method also comprising the current network node further carrying out the following steps:

for each received NSI frame from a neighbouring network node, if the node identifier of the uplink network node in said NSI frame is the node identifier of the current network node, then adding or updating an entry in the IPRT for said neighbouring network node with the IP of the neighbouring network node being the corresponding IP gateway, and for the linked node list comprised in the routing data of said NSI frame, adding or updating entries in the IPRT for each of the linked node list nodes with the IP of the neighbouring network node being the corresponding IP gateway;

marking as expired or deleting any previously entered IPRT entry after a predetermined period of time has passed after the last receiving or updating of said any previously entered IPRT entry.

In an embodiment, the type of node is an indicator on whether the current network node is an OBU node or a RSU node.

In an embodiment, said NSI frame further comprises geographic location data comprising latitude, longitude and elevation of the current network node.

In an embodiment, said NSI frame further comprises motion data comprising speed and heading of the current network node.

In an embodiment, said NSI frame periodical broadcasting is initiated by the current network node when one or more of the following occurs at the current network node: geographic location data available for the current network node, or motion data available for the current network node, or a Provider Service Request start, herewith PSR start, or a PSR start with an Active Connection Provider Service, herewith ACPS; or an User Service Request start, herewith USR start, or an USR start with Active Connection User Service, herewith ACUS.

In an embodiment, the ACPS or the ACUS comprises the Active Connection Provider Service Identifier, herewith ACPSID.

In an embodiment, the ACPSID of the current connection is obtained from the Provider Service Request Table, herewith PSRT, for providers, or from the Available Services Table, herewith AST, for users.

It is also disclosed a method for operating the network node of a wireless digital data network based on broadcast layer-2 periodic frames,
according to any one of the previous methods,
said method for routing data packets in said wireless digital data network,
said method comprising the current network node further carrying out the following steps:
selecting from any other network nodes reachable by the current network node through wireless communication, herewith neighbouring network nodes, an uplink network node which has an uplink connection to an upstream network;
establishing an uplink wireless connection to said uplink network node;
setting the default IP gateway entry in an IP Routing Table, herewith IPRT, to the IP address of the uplink network node;
making available the entries of the IPRT for routing by the current network node;

In an embodiment, said NSI frame further comprises routing data which comprises the node identifier and IP address of the uplink network node for the current network node, and comprises a list of the identifiers and IP addresses of the network nodes that are connected to the uplink network through the current network node itself;

In an embodiment,
said method comprises the current network node further carrying out the following steps:
for each received NSI frame from a neighbouring network node, if the node identifier of the uplink network node in said NSI frame is the node identifier of the current network node,
then adding or updating an entry in the IPRT with the IP of the neighbouring network node being the corresponding IP gateway
for the neighbouring network node and for the list of nodes comprised in the routing data of said NSI frame;
marking as expired or deleting any previously entered IPRT entry after a predetermined period of time has passed after receiving or updating said any previously entered IPRT entry.

In an embodiment, said NSI frame periodical broadcasting is initiated by the current network node when one or more of the following occurs at the current network node: a Provider Service Request start, herewith PSR start, with an Active Connection Provider Service, herewith ACPS; or an User Service Request start, herewith USR start, with Active Connection User Service, herewith ACUS.

In an embodiment, the ACPS or the ACUS comprises the Active Connection Provider Service Identifier, herewith ACPSID.

In an embodiment, the network node selecting an uplink network node from the neighbouring network nodes comprises the network node excluding from said uplink selection any neighbouring network node which is connected to said uplink network through the network node itself.

In an embodiment, if the current network node is a end-point node, then said routing data of the NSI frame is absent or empty.

In an embodiment,
said method comprises the current network node further carrying out:
setting the IP gateway entry for the uplink network node in the IP Routing Table, herewith IPRT, to the IP address of the uplink network node.

In an embodiment, the routing data of the NSI frame further comprises the IP address of an upstream end-point node between the wireless digital data network and the upstream network.

The upstream end-point node between the wireless digital data network and the upstream network is generally a router node between the wireless digital data network and the upstream network in particular for connecting the wireless digital data network to the Internet. Other types of upstream end-point node for connecting to an upstream network are a bridge, gateway, brouter, among others.

In an embodiment, said method comprises the current network node further carrying out:
setting the IP gateway entry for the upstream end-point node in the IP Routing Table, herewith IPRT, to the IP address of the uplink network node.

In an embodiment, the upstream end-point node is a RSU node or a static OBU node, with an uplink connection to the upstream network, in particular to a static Wi-Fi router with an uplink connection to the Internet.

In an embodiment, the Provider Service Context, herewith PSC, of the ACPS or the ACUS comprises the node identifier and the type of node of the current network node; the node identifier of the uplink network node of the current network node; and the node identifier of the upstream end-point node.

In an embodiment, layer-2 is the data link layer of the wireless digital data network protocol.

In an embodiment, the method is limited to the MAC sub-layer of the data link layer of the wireless digital data network protocol.

In an embodiment, an IP address is an IPv4 address, or an IPv6 address, or is comprised by both IPv4 and IPv6 addresses of the same network node.

In an embodiment, the wireless digital data network is a network of wireless access in vehicular environments, in particular a WAVE network.

In an embodiment, the mobile node equipped with an on-board unit, OBU node, is a mobile vehicle node.

In an embodiment, the wireless digital data is a vehicular network, in particular a DSRC network, further in particular a network using IEEE 802.11p.

In an embodiment, the NSI frame is broadcast periodically, at least 5 times per second, further in particular at least 10 times per second, further in particular at least 20 times per second.

It is also disclosed an electronic network node of a wireless digital data network, wherein said network node is programmed to carry out any method based on broadcast layer-2 periodic frames of the above mentioned methods.

In an embodiment, the electronic network node comprises a NSI management entity, herewith NME, contained in the Medium Access Control (MAC) sub-layer of the electronic network node, said NME being programmed to carry out any method based on broadcast layer-2 periodic frames of the above mentioned methods.

In an embodiment, the upstream network is the Internet or a network with Internet connectivity.

It is also disclosed a non-transitory storage media including program instructions for implementing a method for operating a network node of a wireless digital data network based on broadcast layer-2 periodic frames, the program instructions including instructions executable to carry out the method of any of the above mentioned methods.

In an embodiment, NSIs are broadcast layer-2 frames, which can be emitted by providers and/or users, carrying information about the node location and the current connection, including the following:

Node ID—Identifier of the sender;
Node type—Indicates if it is an On-Board Unit (OBU) or a Road Side Unit (RSU);
Active Service PSID—Current active service PSID;
Active type—type of the current service, where it can be a provider service or an user service;
GPS information—Includes latitude, longitude, elevation, heading and speed.
Extra information—relevant information outside the scope of the existing main information blocks.

Even without the optional GPS or extra information payloads, simply broadcasting the basic NSI frame data enables nodes to learn about the presence of other nodes and the services that those nodes may be providing, independently if these are providers or users.

Each network node will normally connect and maintain an uplink to a node that will have direct or indirect connectivity to the backhaul, i.e. a connection to a suitable upstream network, e.g. the Internet. For example, the current available provider nodes are monitored and a mean of the Received Signal Strength Indication (RSSI) of the last N received frames from each provider nodes is stored at the WAVE Management Entity (WME). It is used for example a mean of the RSSI from received frames in order to reduce the error on its observation, since this parameter can present a high variation between two values. The decision of the next connection can then be made based on the best mean of RSSI above a certain or predetermined threshold, assuming provider nodes below this threshold are not candidates since they do not present an acceptable signal strength. This way, each network node will normally have one uplink connection or none uplink connection if there are no nodes, within reach, having connectivity to the Internet.

Other methods for choosing the uplink node may be chosen instead of the best RSSI, for example geographic proximity or least number of hops to a static node (RSU node).

The current connection is available at the layer-2 by accessing the PSC from the current active service, available at the Provider Service Request Table (PSRT) for providers, or at the Available Services Table (AST) for users, which is part of the WME Management Information Base (MIB) [1]. Since NSIs are sent and received by the NSI Management Entity (NME) which is implemented at the Medium Access Control (MAC) sub-layer (the lowest sub-layer of the Data Link layer, second layer of the OSI model [2]), storing the received neighbours information in the NSI Table (NSIT), it is a low delayed process, where all the information it needs is available at this level.

Generally, the link layer is usually the lowest layer in a network protocol stack, for example like in the Internet Protocol Suite, commonly known as TCP/IP. An example of link layer is described in RFC 1122 and RFC 1123.

The link layer can be generally defined as the group of methods and communications protocols that only operate on the link that a host is physically connected to. The link is generally the physical and logical network component used to interconnect hosts or nodes in the network and a link protocol is generally a suite of methods and standards that operate only between adjacent network nodes of a local area network segment or a wide area network connection.

The link layer can also generally be described as a combination of the data link layer (layer 2) and the physical layer (layer 1), for example as defined in the OSI model.

According to an embodiment, node which intends to participate on the herewith disclosed routing process announces a service (Active Connection Provider Service (ACPS) or Active Connection User Service (ACUS)) with the Active Connection PSID (ACPSID) where its PSC should contain the following information:

Node ID—Identifier of the provider advertising the service;
Node type—Indicates if it is an On-Board Unit (OBU) or a Road Side Unit (RSU);
End-point ID—Identifier of the node which provides the backhaul. It can be a RSU or a static OBU;
Next-hop ID—Identifier of the next-hop node which provides connectivity to the end-point node.

After requesting the service with the ACPSID, the node starts to monitor the routing information received through neighbour's NSI frames, including the updated routing information in its NSI frames as well. As referred earlier, the NSI frames may carry information about the node location and its current active connection, but it can also carry routing information, letting neighbours know it is participating on the presently disclosed routing process, herewith called SB2RP, or Service-Based layer-2 Routing Protocol.

The information stored at the NSIT is used by SB2RP to add the routing information to the system, where a node included by SB2RP on the routing process may send and receive the following routing information through the NSIs:

Next-hop ID—Identifier of the next hop for the sender;
End-point ID—Identifier of the node which provides the backhaul. It can be a RSU or a static OBU;
Internet Protocol (IP) information—Internet Protocol version 4 (IPv4) and Internet Protocol version 6 (IPv6) addresses;
Linked list—A list of nodes marking the sender as its next-hop, containing the node ID, IPv4 and IPv6 addresses of each linked node.

Since the node needs to "register" itself to start the routing process by requesting a service with the ACPSID, SB2RP only evaluates the IP Routing Table (IPRT) if the node is on its chain, so no extra effort is spent by the protocol.

Upon the reception of a NSI frame by a specific node, the NME checks if the specific node has a requested service containing the ACPSID invoking the specific node WME, adding the neighbour's IP and its linked node's IP address to the main system IPRT if the node is its next-hop. On the transmission side, the node adds this to its routing information and checks which nodes are linked to it, adding all the IP information in the NSI frame.

NME is called and evaluates the system each t second. Each time a NSI is received, the NSI table (NSIT) is checked to find out if the specific node is already present. If the node has already an entry, the reception time is updated, indicating to the NME the node still in range. A NSI table entry is considered expired if no NSI frame was received in a predefined time limit, for example the last timeout seconds. NME is also responsible for checking if an entry from the NSI table has already its IP registered, in case the neighbour is present on the same chain. It also manages the change of a linked or direct neighbour, updating NSIT records when and if necessary.

This disclosure targets in particular the vehicular environment in order to operate and contribute to its better performance. SB2RP can enhance the vehicular communications since it provides a method to forward information on a multi-path scenario. Increasing the multi-hop communication implies the decrease of the number of RSUs needed to provide a reliable and fast communication, extending the communication range.

BRIEF DESCRIPTION OF THE DRAWINGS

The following figures provide preferred embodiments for illustrating the description and should not be seen as limiting the scope of the disclosure.

DETAILED DESCRIPTION

The following discussion provides preferred embodiments for illustrating the disclosure and should not be seen as limiting.

The growing interested on the vehicular network subject has been actively supported by the IEEE group, with several publications and standards that define and suggest different ways of implementing and testing it in real life [3]. Today there are many testbeds around the world that have tested and still testing real vehicular networks, such as the Leixões "harbornet" [4], improving and enhancing the vehicular communication. One of the key topics and hardest tasks in this tough environment is defining and implementing a suitable routing protocol. A routing protocol which can achieve the service needs within the vehicular environment, may be a great feature to the network performance, extending the network communication range and the congestion by reducing the need of a high number of RSUs in place. In order to achieve this goal, every node should share its information within the network, providing crucial information affecting the connection and routing decision. The present disclosure defines the NSI frames as broadcast frames carrying the current node information, sharing it over the network.

Figure 1:
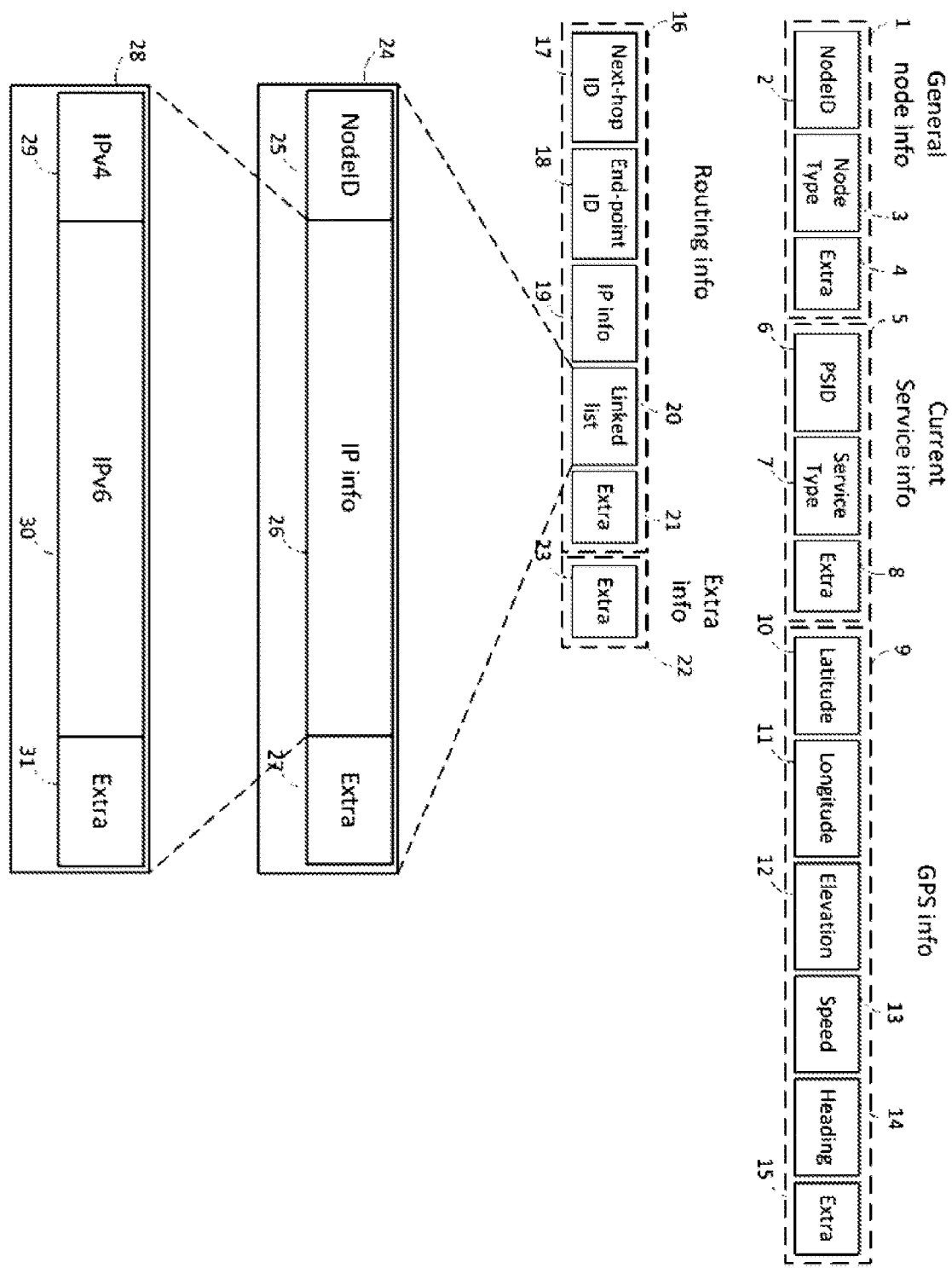
FIG. 1 is a graphical representation showing how the NSI frame may be built.

FIG. 1 represents the different information blocks that should be present within the NSI frame. The NSI frame is divided into three different main information blocks: general node info (1), current service info (5), GPS info (9) and routing info (16). Each sub-block (2, 3, 6, 7, 10, 11, 12, 13, 14, 17, 18, 19, 20) of these main blocks may have different sizes depending on the implementation, where an extra sub-block (4, 8, 15, 23) is present in each main block, which is a variable size sub-block containing extra relevant information for the network. The main block 22 is an extra information block where other kind of relevant information, outside the scope of the defined main information blocks, should be placed. Sub-block 20 is a list of linked neighbours for the node sending this NSI frame, and each entry of the list contents are better illustrated by 24. Each entry preferably contains the node ID (25) of the linked neighbour, its IP information (26) and any other relevant information (27). Sub blocks 19 and 26 represents the IP information for the node sending the NSI frame and for a linked neighbour entry of the linked list, respectively. Subblock 28 shows that IP information should carry the current IPv4 (29) and IPv6 (30) addresses and any other relevant IP information, represented by 31.

In order to participate on the routing process, each node requests a service identified by an identifier, in this embodiment an Active Connection Directory Identifier (ACPSID. It is by requesting the ACPS that the provider node indicates the NME the next-hop and end-point nodes, and that it should start including the node into the routing process. Since the decision of which next-hop and end-point nodes to connect are informed through the PSC, and PSC is a static field of a provider request, NME targets the routing information based on it, avoiding switching to another link until the current provider service is ended. Following this logic, in order to change the connected link the current provider service is ended and requested again with its PSC changed, containing the information of the new link. Upon the ending request of the provider service, NME checks that no ACPS request is present at the WME MIB and flushes all the routes for the old link, adding the new ones by an indication that a new ACPS was requested. The information is then propagated through all connected nodes above on the hierarchy, until it reaches the end-point. This propagation may result on retransmissions, since an amount of packets travelling downstream may be lost during the upstream propagation process. Since the NME sends NSI frames frequently, e.g. in a period of at least 10 frames per second, this packet loss is minimum. Deciding for the next-hop connection, SB2RP excludes all nodes currently linked to itself, thus avoiding loops in the process.

Figure 2:
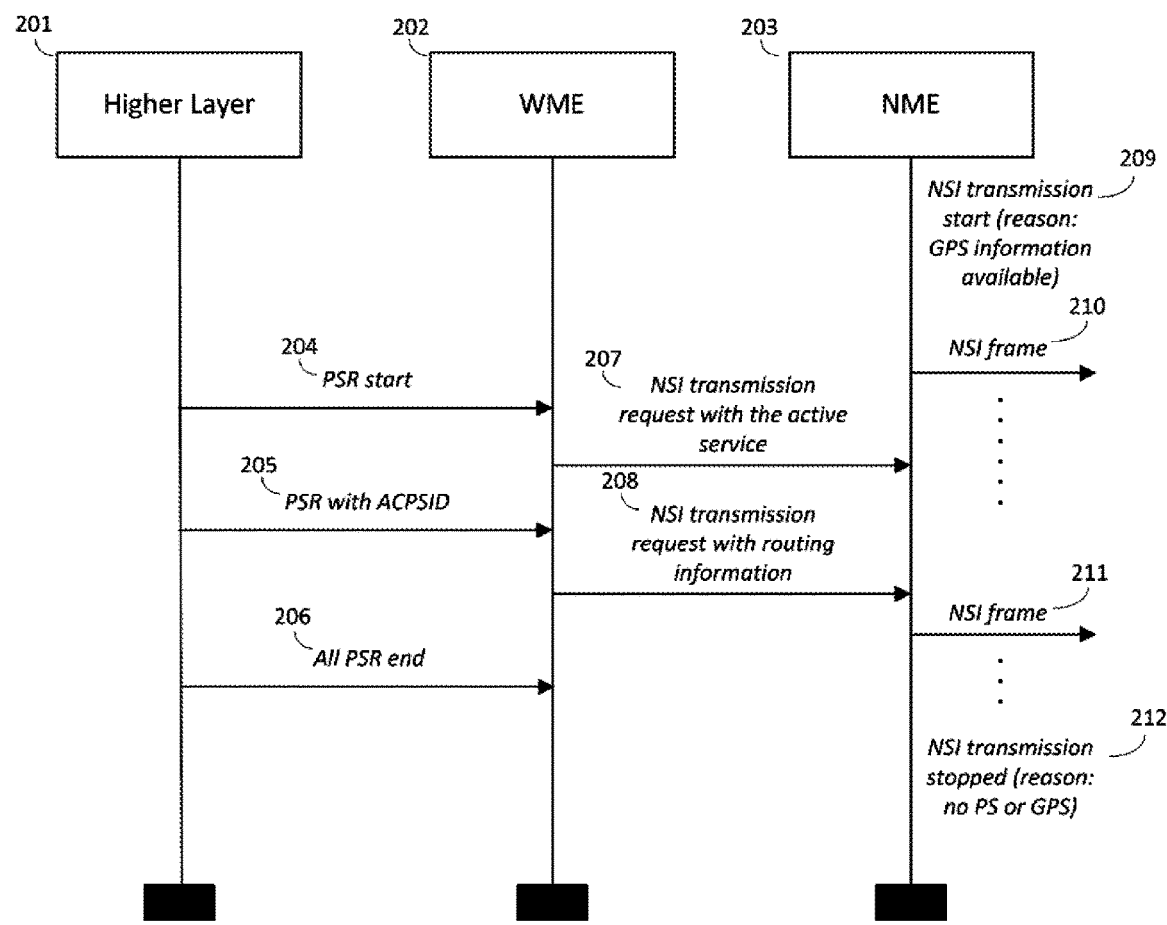
FIG. 2 is a graphical representation showing the information flow for NSI frames in a presence of a provider service request.

Referring to FIG. 2, the information flow for NSI frames is shown regarding provider nodes. NSI transmission starts since there is GPS information available (209). A PSR start (204) sent by a higher layer (201) is received by the WME (202) which sends a NSI transmission with the active service request (207) to the NME (203). NME (203) updates the broadcast NSI frame (210) construction, monitoring and transmission process. Later WME (202) receives a PSR for a service identified by the ACPSID (205), sending a NSI transmission request (208) to the NME (203). NME (203) detects the ACPS and updates the NSI frame with the routing information (211). The NSI transmission stops when no service is currently requested and active in the node (206) and no GPS information is available (212).

Figure 3:
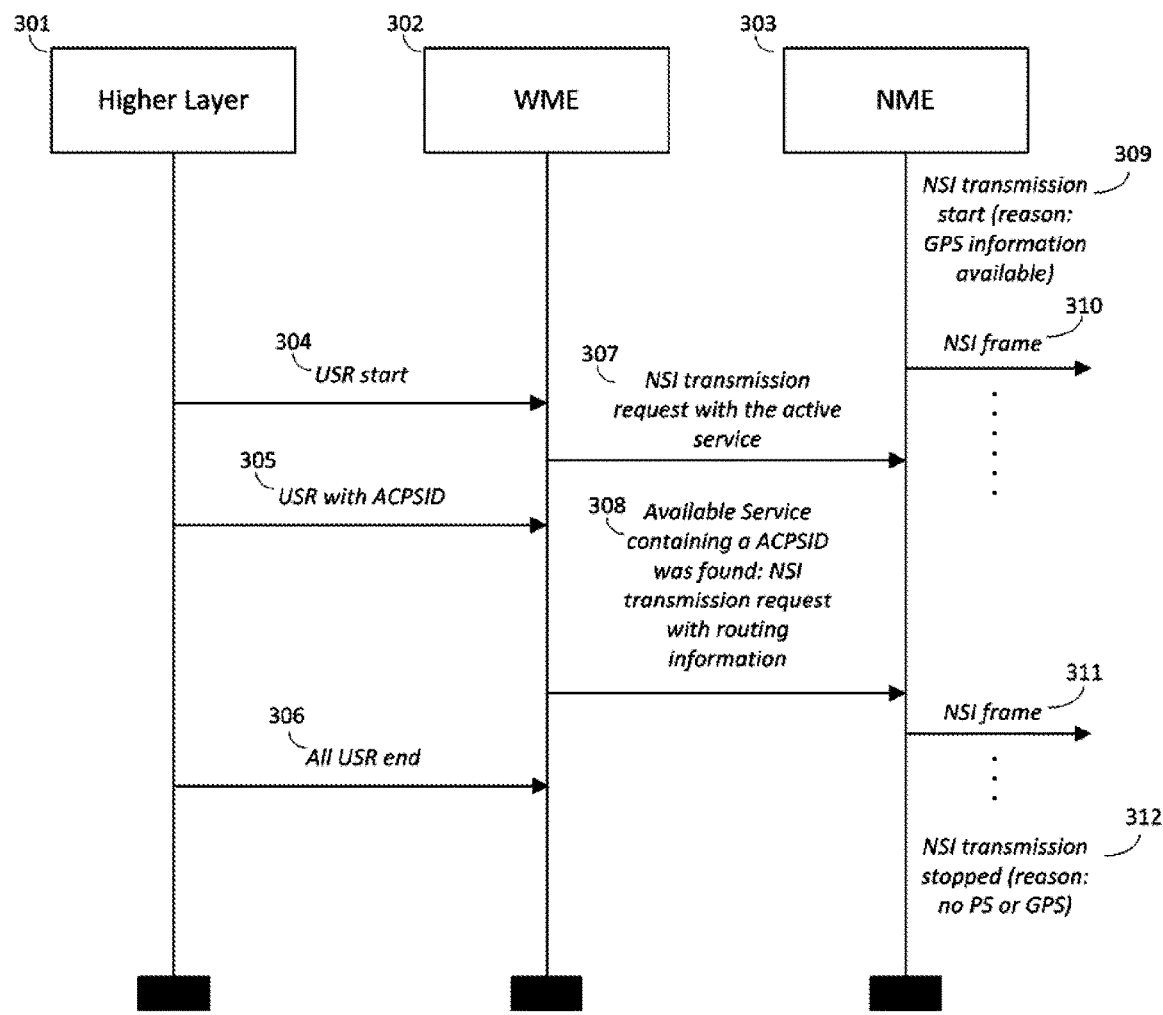
FIG. 3 is a graphical representation showing the information flow for NSI frames in a presence of an user service request.

Referring to FIG. 3, the information flow for NSI frames is shown regarding user nodes. Since the node has GPS information available, the NSI transmission process is initialized (309). A User Service Request (USR) (304) is received by the WME (302) sent by a higher layer (301), which starts monitoring the AST looking for matching advertisements and sends a NSI transmission request (307) to the NME (303), which updates the NSI frames (310). WME receives a USR later containing the ACPSID and finds a matching available service with the same PSID (305), starting the communication on the Service Channel (SCH) specified in the available service. WME sends a NSI transmission request (308) to the NME, which updates the NSI frames with the routing information (311). As explained above, the NSI transmission stops when no service is currently requested and active in the node (306) and no GPS information is available (312).

Figure 4:
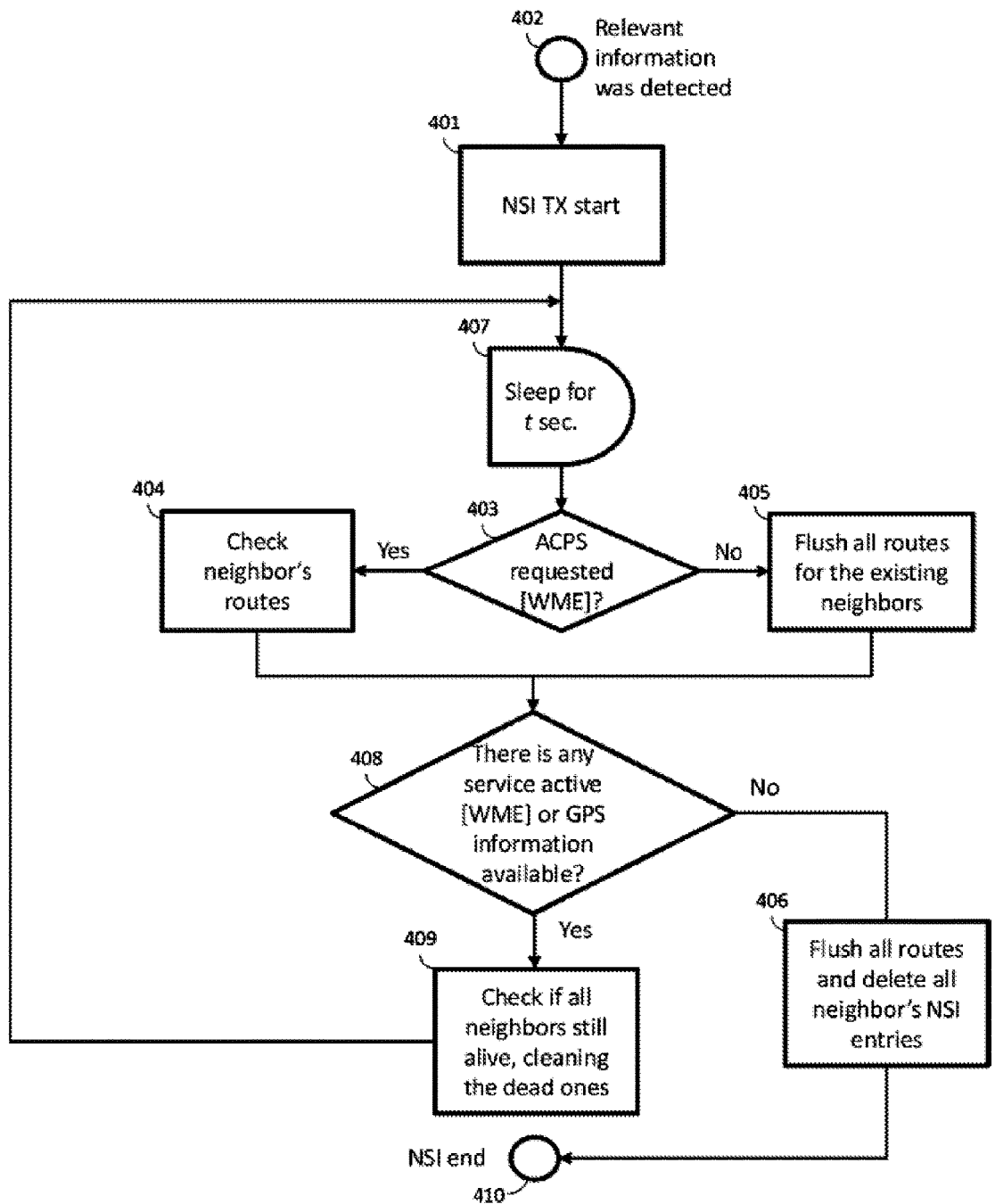
FIG. 4 is a block diagram describing the monitoring process performed by the NME.

NSI frames should be sent if there is any relevant information about the node, so its neighbours can be aware of it. Upon the initialization of the WAVE system, a node can send NSI frames, even if there is no active service and it still communicating through the Control Channel (CCH), for example sending its GPS information, providing information about its location to its neighbours. FIG. 4 is a block diagram illustrating the monitoring process performed by the NME, as referred above. When relevant information is detected by the NME (402), it starts the NSI transmission (401) and the monitoring process. The monitoring process start sleeping for t seconds (407), since there is no point on checking the current state of the system once the NSI transmission just started. Each t seconds the NME asks the WME if the system has a registered ACPS (403), checking the neighbour's routes (404) upon a positive answer and flushing all registered routes for each existing neighbours (405). Block 403 consists on walk through the NSI table, checking if each entry has the node ID of the board as its next-hop ID. If the neighbour's next-hop is equal the node ID and its routes are not registered, NME adds the routes with the neighbour's IP information and its linked neighbours as well. In the case the neighbour's routes are already registered, NME checks if the neighbour still connected and if the linked list for this neighbour has been changed, and if necessary updating all routes. After dealing with the routing information, the NME asks the WME if there is any active service (408), checking if all neighbours have received a NSI frame within the last timeout seconds (409), deleting its entry and flushing its routes and its linked neighbour's routes, for neighbours presenting a received time higher then timeout. The monitoring process goes to sleep again, waiting t seconds (407) to repeat the process. If no active service is registered or no GPS information is available, the NME flushes all routes for each NSIT entry, deleting the entry (406). With all NSIT entries deleted, the NSI process is done and the monitoring process stops (410).

Figure 5:
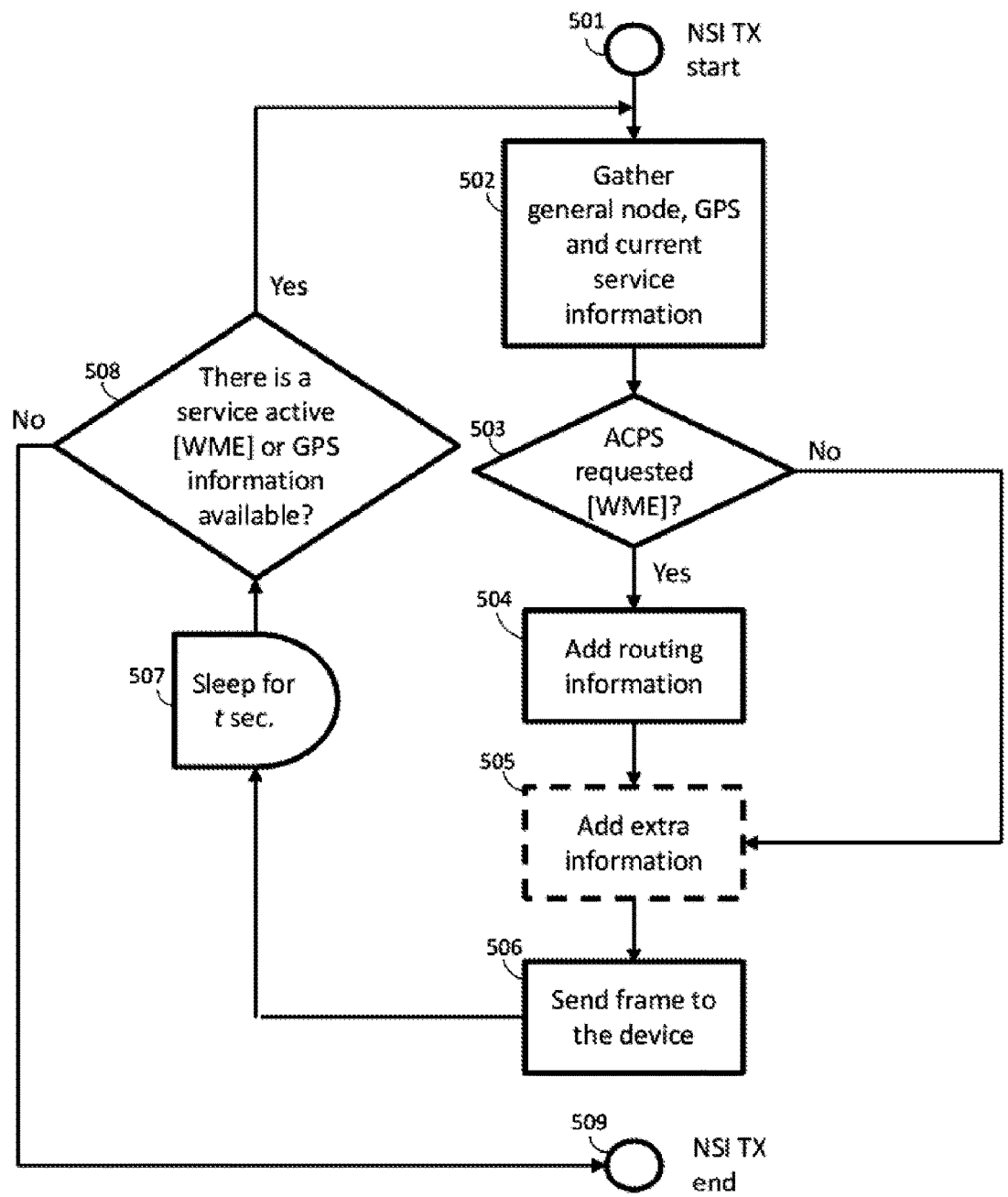
FIG. 5 is a block diagram describing the transmission steps of a NSI frame.

FIG. 5 is a block diagram illustrating the NSI transmission process, invoked by the NSI monitoring process, described above. Upon the NSI transmission start request (501), the NME gather the current information about the node, adding the available information, regarding the general node, GPS and active service, to the NSI frame (502). The NME then asks the WME if there is a ACPS registered (503) within its MIB, adding the routing information if the response is positive (504). NME adds extra relevant information to the NSI frame if available (505), sending it to the device (506). The NSI transmission process sleeps for t seconds (507), waiting to send a new and updated NSI frame. After waking up, the NME asks the WME if there is any active service at this moment or no GPS information is available (508), repeating the process upon a positive answer or stopping the NSI transmission process otherwise (509).

Figure 6:
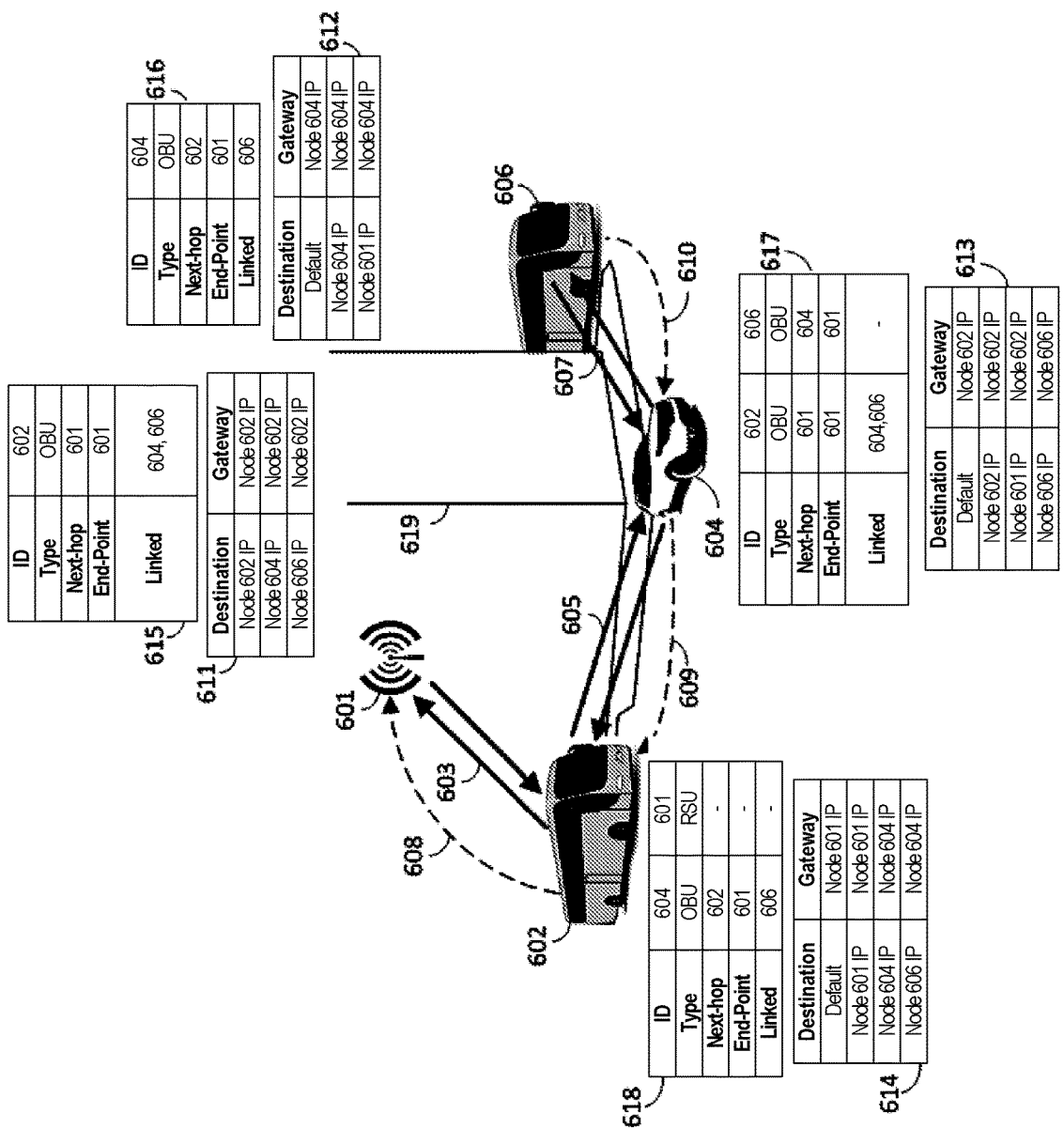
FIG. 6 shows a simple representation of single-hop and multi-hop communication between vehicles on the road, presenting each NSI table and IPRT contents.

FIG. 6 shows a vehicular network containing four nodes, one RSU (601) and three OBUs (602, 604, 606). This scenario illustrates the situation where the node 606 cannot reach the RSU 601 and the node 602, blocked by the building 619. The NSIT is shown for each node (615, 616, 617 and 618), where the NSI communication is represented by 603, 605 and 607. 611, 612, 613 and 614 represents the IPRT for each node and 608, 609 and 610 represents the IP communication path chosen by each node. Analyzing the NSIT 615, which shows the NSIT for the RSU 601, it is easy to understand that the node 602 is an OBU directly connected with the RSU 601, performing a single-hop data path (608). The linked list shown in the table 615 indicates the RSU 601 must include these nodes in the routing path. Looking at the table 611 which shows the IP routes registered by the RSU 601, all linked nodes has a route with its gateway equals the node 602's IP address, so in order to reach the linked nodes, the RSU 601 knows it must go through the node 602.

Table 618 shows the NSIT for the node 602, where NSI frames have been received from the node 604 and the node 601. Through the NSIT, node 602 can learn the node 601 is a RSU and node 604 an OBU, which has its next-hop ID set to node 602, so it is directly connected to node 602, and it is trying to reach node 601, since node 601 appears as its end-point ID. Node 602 also learns that node 604 has a linked neighbour, node 606, adding its route on the IPRT (614) with its gateway set to node 604's IP address. Note that node 602 performs a single-hop communication with the RSU 601, so its default gateway is the node 601.

Tables 613 and 617 show the IPRT and NSIT for node 4, respectively. Table 617 shows NSI frames from node 602 and 606 has been received by node 604, and that 602 is connected directly to the node 601. Despite node 604 has no NSIT entry with the node 601 information, it can assume node 601 as a end-point which provides backhaul, since it is the end-point for node 602. From table 617, node 604 can also learn that node 606 has the next-hop ID set to node 604, which makes it a linked neighbour. Node 604 adds the routes to the RSU 601 reaching it through node 602 (this connection is represented by 609, setting its default gateway to node 602), as shown by table 613, and it is also connected to node 602 and 606 directly.

Finally, the node 606 completes the chain with tables 612 and 616 presenting its IPRT and NSIT, respectively. NSIT shows only one entry for node 604, which is connected directly to node 602 trying to reach the end-point 601. Node 606 has node 604 as its next-hop as shown by the linked field in table 616 and all gateways are set to the node 604's IP address, shown by table 612 (this virtual connection is represented by 610). Considering one-hop connection a link between two nodes, FIG. 5 shows a three-hop communication path, using the routing protocol defined by an embodiment of the present disclosure. Since each node adds the routing information along the chain, the present disclosure provides bidirectional communication path between the end-point and each node within the chain.

Figure 7:
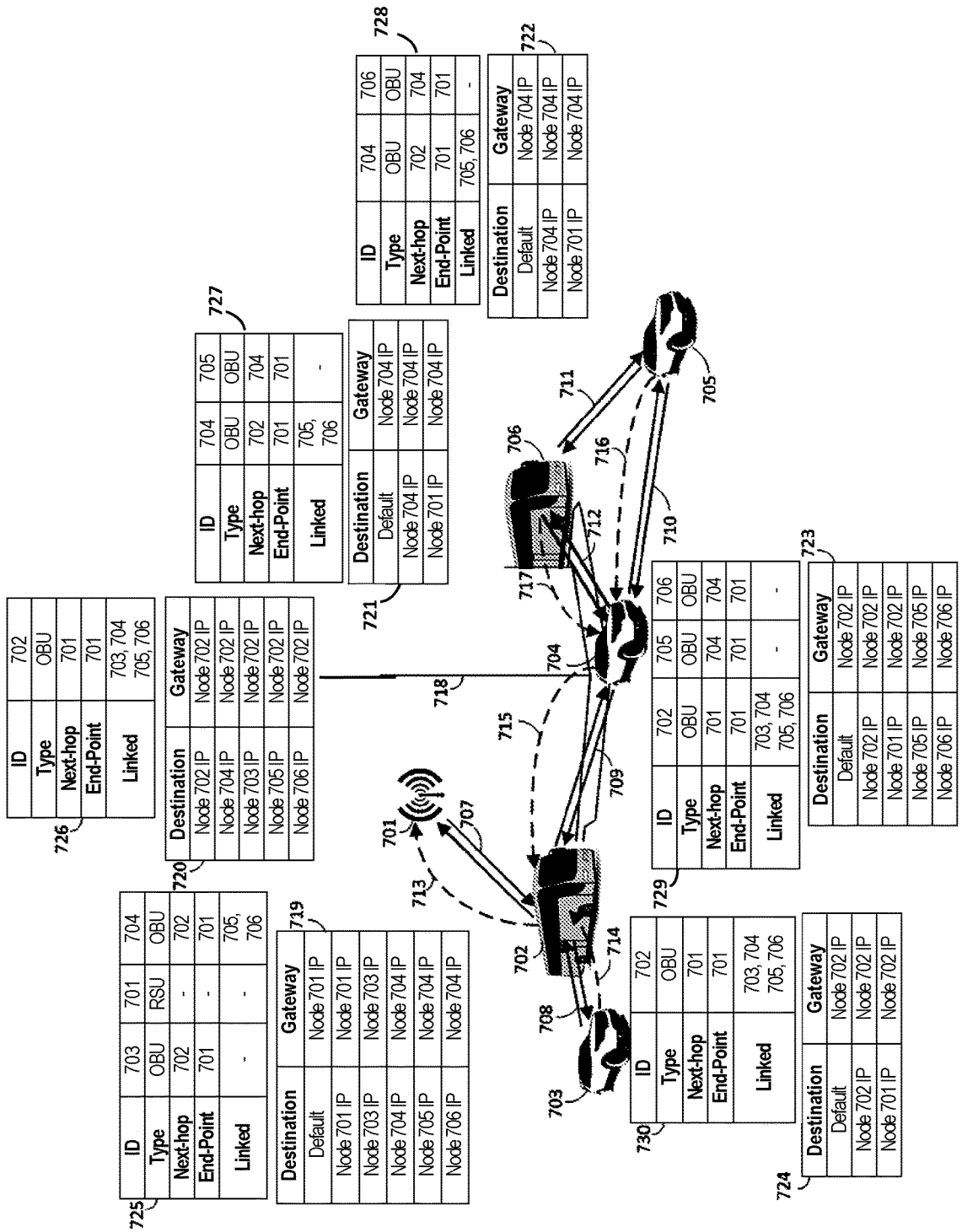
FIG. 7 shows a more complex representation of single-hop and multi-hop communication between vehicles on the road, presenting each NSI table and IPRT contents.

FIG. 7 shows a more complex example of the application of the present disclosure within a vehicular network. The vehicular network shown consists in six nodes, one RSU (701) and five OBUs (702, 703, 704, 705 and 706). Just like the scenario illustrated by FIG. 5, FIG. 6 illustrates the situation where the node 706 cannot reach the RSU 701 and the node 702, since it is blocked by the building 718. The NSIT is shown for each node (725, 726, 727, 728, 729 and 730), where the NSI communication is represented by 707, 708, 709, 710, 711 and 712. 719, 720, 721, 722, 723 and 724 represents the IPRT for each node and 713, 714, 715, 716 and 717 represents the IP communication path chosen by each node. The following description of the FIG. 6 will explain the whole communication and routing process, taking a node by node evaluation.

Tables 720 and 726 show the IPRT and the NSIT for node 701. From table 726, node 701 has only one NSIT entry, showing information sent by node 702, which is an OBU and is directly connected to node 701. Analyzing the information within the node 702's NSIT entry, node 701 can also learn which nodes are currently linked to node 702 and register the routes of the linked nodes in the system. The registered routes are shown by table 720, where all nodes have its gateway set to node 702's IP address. Node 702 is directly connected to the RSU 701 as shown by tables 719 and 725. It performs a single-hop connection with the RSU 701, illustrated by 713. Table 725 shows that node 702 receives NSI frames from the RSU 701 and from nodes 703 and 704, where node 703 and 704 are directly connected to node 702, setting node 702 as its next-hop (default gateway). Node 702 also learns that node 704 has node 706 and 705 linked to it, so table 719 shows nodes 706 and 705 routes with its gateway set to node 704's IP address.

As concluded above, node 703 is directly connected to node 702 and has no linked neighbours, so it is one of the edges of the routing path. Table 730 shows that node 703 has just received NSI frames from node 702, choosing node 702 as its next-hop with its default gateway set to node 702's IP address, represented by 714, and its IPRT (724) consists of the default gateway and path to the RSU 701, passing through node 702. Note that node 703 performs a two-hop communication with the RSU 701.

Looking at node 704, as well as node 703, it is directly connected with node 702, choosing it as its next-hop with its default gateway set to node 702's IP address, illustrated by 715. Table 729 shows that nodes 706 and 705 are directly connected to node 704, since the next-hop field in the NSIT entry for both nodes indicate node 704 as the next-hop, these connections are illustrated by 716 and 717. Table 723 shows the IP routing information, where each node connected to node 704 is a direct connection but node 701, which has node 702's IP address as its gateway, indicating the path to the RSU 701. Considering this scenario, node 704 performs a two-hop communication with the RSU 701.

It may be noted that, in this embodiment, even if nodes 703 and 704 could know each other through the NSI broadcast from node 702 (which lists both nodes 703 and 704 as linked nodes of node 702), nodes 703 and 704 do not use this information for updating their IPRT table. This way, routing potential packets between nodes 703 and 704 may actually made by the IPRT of node 702 or other upstream nodes, with nodes 703 and 704 merely forwarding such packets to their default gateway, which does happen to be node 702.

Nodes 706 and 705 are edge nodes which can reach each other, as shown by the NSITs 727 and 728, but have chosen node 704 as its gateway to reach the end-point 701, illustrated by 716 and 717, and IPRTs 721 and 722. Even though they can reach each other, their IPRT has no route for each other, since one is not part of the chain of the other. This approach saves processing resources and memory, avoiding loops and unnecessary effort from the routing protocol, automatically ensuring a tree topology. Nodes 706 and 705 perform a three-hop communication with the RSU 701, with all traffic passing through node 704.

Figure 8:
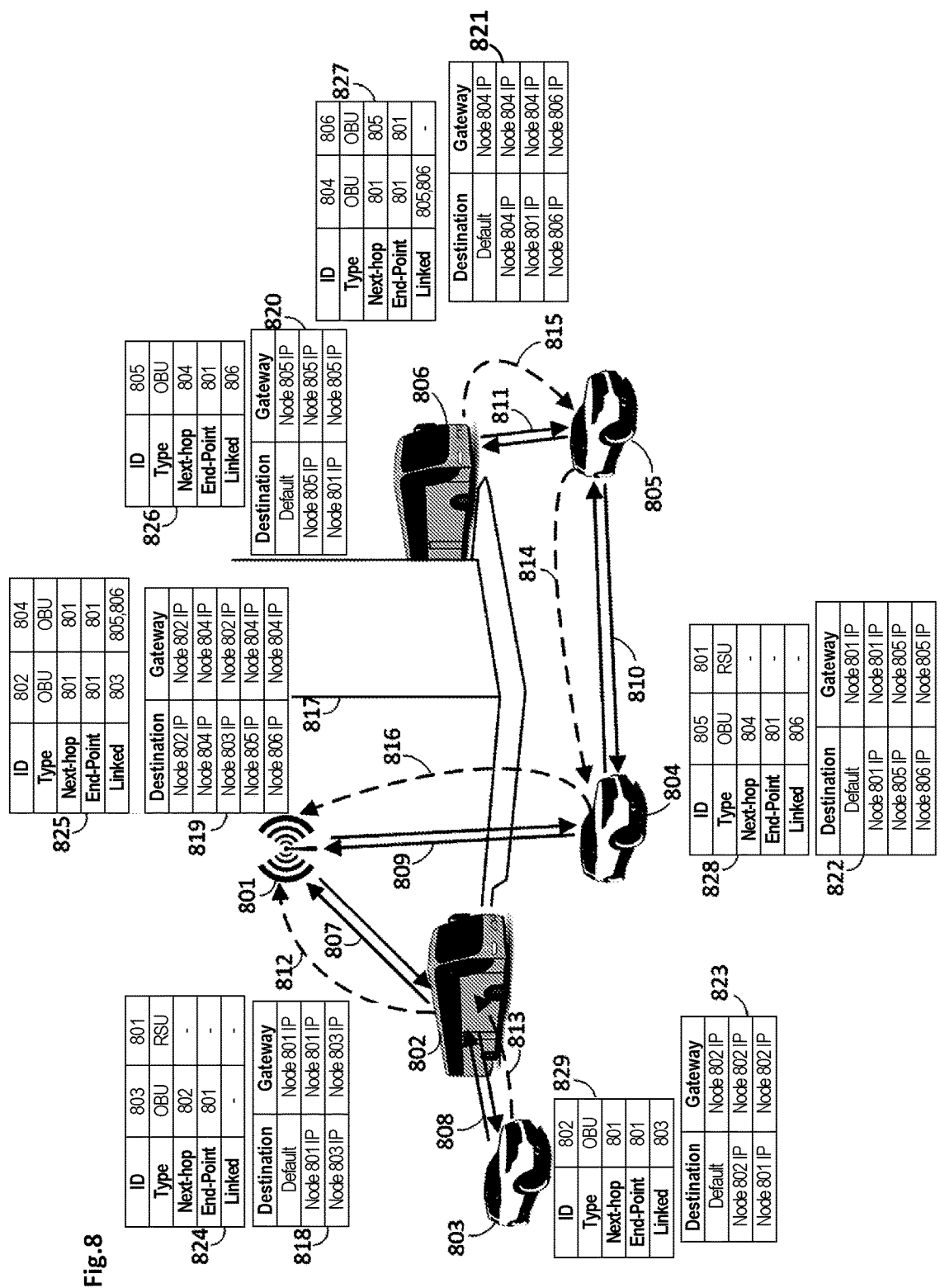
FIG. 8 illustrates the situation illustrated by FIG. 7 changed by the movement of one of the nodes represented.

Referring to FIG. 8, the situation illustrated by FIG. 7 changes when node 704/804 loses contact with node 702/802 and detects the RSU 701/801 has a better signal strength and indicates it as its next-hop node. With this scenario, as shown by table 825, node 702/802 has only one linked node (703/803) from now on. Node 706/806 has also lost the connection with node 704/804, choosing node 705/805 as its next-hop. Said that, following a node by node description is presented for this scenario.

Tables 819 and 825 show the IPRT and the NSIT for node 801. Evaluating the contents of table 819, node 801 receives information about nodes 802 and 804, where it learns that the two of them are connected directly to it and node 802 has one linked node (803), and node 804 has two linked nodes, 805 and 806. It then computes the routes for the two directly connected nodes and its linked nodes, as shown by table 819.

Node 802 has selected node 801 as its next-hop, so its default gateway is set to node 801 IP address, as shown by table 818. Node 802 also has node 803 announcing node 802 as its next-hop through its NSI frames, as shown by table 824, where node 802 directly connected to node 803.

Looking at table 829, node 803 has only one NSI entry referring node 802, which was chosen as next-hop by node 803. Table 818 shows the IPRT for node 803, where its computed the routes for its next-hop, node 802 as its default gateway, and for the end-point, the RSU 801.

Evaluating node 804 through its tables 822 and 828, node 804 has chosen node 801 as its next-hop, registering its IP address as the default gateway to the IPRT. Only node 805 is linked to node 804 directly, presenting node 806 as its linked node. Node 804 registers a direct route to node 805 and a route to node 806 with gateway to node 805.

Node 805 has chosen node 804 as its next-hop, as shown at table 827. Looking at table 821, node 805 computes node 804 IP address as its default gateway, being directly connected to it. Node 805 also learns through table 827 that node 806 is a linked node, registering a direct route to it.

Finally, node 806 has selected node 805 as its next-hop, computing node 805 IP address as its default gateway, being directly connected to it.

The situation described above for FIG. 8 is intended to show how the situation illustrated by FIG. 7 can evolve. Notice that during the process of a node being part of the chain choosing a different link, the network will depend on the propagation of the information to restructure its paths, where retransmissions may happen for brief moments. Since NSI frames are transmitted each 100 milliseconds (10 frames per second), it can take up to 100 milliseconds to a node notice that a linked node is not linked to it anymore, updating then its routes. It is also worth to say that a node choosing a new link is going to ignore its linked nodes in the process. For instance, node 704/804, while choosing which will be its new next-hop, ignore nodes 705/805 and 706/806, so they are linked to it.

An embodiment describes a method for wireless network routing targeting the vehicular environment, using Service-Based layer-2 Routing Protocol (SB2RP) comprising:

defining a novel sharing broadcast information method over layer-2 frames, called Node Status Information (NSI);

defining a specific identifier for a Provider Service (PS) intending to request the sharing of the node's information, where any other PS request will not trigger the start of the routing mechanism;

defining the interaction processes between the Node Management Entity (NME) and higher layers, from which the PS requests are generated, deciding whether or not the SB2RP is going to be used for the specific node;

defining the main processes should be performed by the NME, focusing the monitoring and transmission processes of NSI frames.

An embodiment describes that the NSI frame contents should contain essential information, relevant to the network, including: general node, GPS, current active service and routing information.

An embodiment describes that the routing information should include the Internet Protocol (IP) information regarding the sending node, the targeted end-point identifier, the targeted next-hop identifier and a list of linked nodes, referring to neighbours targeting the sending node as its next-hop. The linked list should contain IP information and the node identifier of the linked node.

An embodiment describes that nodes wait for a protocol specific PS request to start the routing mechanism, called Active Connection Provider Service (ACPS), which identifier is called ACPS Identified (ACPSID).

An embodiment describes that the NME should receive a trigger from higher layers, in order to initiate sharing of any kind of information over the network, ending the sending process when there is no active PS registered.

An embodiment describes that the Provider Service Context (PSC) of the ACPS is used to provide current connection information to the NME, including: sending node identifier, sending node type, the targeted end-point node identifier and the targeted next-hop identifier.

An embodiment describes that the monitoring process performed by the NME should start the transmission process for NSI frames upon its initialization, monitoring the existence of a ACPS registered by higher layers, adding/deleting routing information if needed. NME is also responsible for monitoring the NSI Table (NSIT).

An embodiment describes that the NME should handle the transmission process for NSI frames, adding/updating relevant information to a broadcast layer-2 frame, sent periodically over the time.

The present disclosure describes how the present disclosure which includes broadcasting routing-aware layer-2 packets enables a routing mechanism which was normally fully contained in other protocol layers, e.g. layer-3, thus enabling a fast and flexible mechanism for multi-hop communications in vehicular networks.

The routing protocol described above is in conclusion simple and very effective, extending the communication range, providing backhaul for multi-hop node communications, also providing the network with paths for offloading traffic, since single-hop communication alone must use much more cellular communications in order to overcome blind spot situations.

The term "comprising" whenever used in this document is intended to indicate the presence of stated features, integers, steps, components, but not to preclude the presence or addition of one or more other features, integers, steps, components or groups thereof.

Flow diagrams of particular embodiments of the presently disclosed methods are depicted in figures. The flow diagrams do not depict any particular means, rather the flow diagrams illustrate the functional information one of ordinary skill in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

REFERENCES the following references are to be considered herewith incorporated in its entirety.

[1] "IEEE Standard for Wireless Access in Vehicular Environments (WAVE)—Networking Services" *IEEE Std 1609.3-2010 (Revision of IEEE Std 1609.3-2007)*, Dec. 30, 2010;

[2] D. Harinath, "OSI Reference Model—A Seven Layered Architecture of OSI Model"—International Journal of Advanced Research in Computer Science and Software Engineering, vol. 3, no. 8, August 2013;

[3] Carlos Ameixieira, José Matos, Ricardo Moreira, André Cardote, Arnaldo Oliveira, and Susana Sargento. An IEEE 802.11p/WAVE implementation with synchronous channel switching for seamless dual-channel access. In Vehicular Networking Conference (VNC), 2011 IEEE, pages 214_221. IEEE, 2011.

[4] Carlos Ameixieira, André Cardote, Filipe Neves, Rui Meireles, Susana Sargento, Luis Coelho, Joãao Afonso, Bruno Areias, Eduardo Mota, Rui Costa, Ricardo Matos and João Barros. Harbornet: A real-world testbed for vehicular networks, December 2013.

The invention claimed is:

1. A method for operating a network node of a wireless digital data network based on broadcast layer-2 periodic frames, for routing data packets in said wireless digital data network, wherein said network comprises a plurality of network nodes, wherein each network node is either a mobile node equipped with an on-board unit (OBU) node, or is a static node equipped with a road-side unit (RSU) node, said method comprising a current network node of the plurality of network nodes carrying out the following steps:

periodically broadcasting a layer-2 Network Status Information (NSI) frame which comprises a node identifier of the current network node and a type of node of the current network node;

receiving broadcasted NSI frames from neighbouring network nodes of the plurality of network nodes reachable by the current network node through wireless communication;

for each received NSI frame:

storing the received NSI frame in an entry in a NSI table (NSIT) when the received NSI frame was a first received NSI frame from a neighbouring network node, otherwise, when the received NSI frame was not the first received NSI frame from the neighbouring network node, updating a previously stored NSIT entry with the received NSI frame; and marking as expired or deleting any previously entered NSIT entry after a predetermined period of time has passed after receiving or updating said any previously entered NSIT entry, wherein said received NSI frame further comprises routing data which comprises a node identifier and an IP address of an uplink network node for a node broadcasting said received NSI frame, and comprises a list of the identifiers and IP addresses of the network nodes that are connected to an uplink network through the neighbouring node broadcasting said received NSI frame, herewith mentioned as linked node list, wherein the step of periodic broadcasting of said received NSI frame is initiated by the current network node when one or more of the following occurs at the current network node:
   new geographic location data is available for the current network node,
   new motion data is available for the current network node,
   a Provider Service Request start (PSR start),
   a PSR start with an Active Connection Provider Service (ACPS),
   a User Service Request start (USR start), or
   a USR start with Active Connection User Service (ACUS), and wherein the Provider Service Context (PSC) of the ACPS or the ACUS comprises the node identifier and the type of node of the current network node; the node identifier of the uplink network node of the current network node; and a node identifier of an upstream end-point node.

2. The method of claim 1, wherein said method is used for routing data packets in said wireless digital data network, said method comprising the current network node further carrying out the following steps:
   selecting from the neighbouring network nodes an uplink network node that has an uplink connection to an upstream network;
   establishing an uplink wireless connection to said uplink network node;
   setting a default IP gateway entry in an IP Routing Table (IPRT) to an IP address of the uplink network node;
   making available the entries of the IPRT for routing by the current network node.

3. The method of claim 2, wherein the current network node selecting an uplink network node from the neighbouring network nodes comprises the current network node excluding from said selecting step any neighbouring network node which is connected to said uplink network through the current network node itself.

4. The method of claim 2, further comprising the current network node further carrying out the steps of:
   for each received NSI frame from a neighbouring network node, if the node identifier of the uplink network node in said NSI frame is the node identifier of the current network node,
   then adding or updating an entry in the IPRT for said neighbouring network node with the IP address of the neighbouring network node being the IP gateway for reaching said neighbouring network node, and
   for the linked node list comprised in the routing data of each received NSI frame, adding or updating entries in the IPRT for each of the linked node list nodes with the IP address of the neighbouring network node being the IP gateway for reaching each of the linked node list nodes; and marking as expired or deleting any previously entered IPRT entry after a predetermined period of time has passed after the last receiving or updating of said any previously entered IPRT entry.

5. The method of claim 1, wherein, when the current network node is an end-point node, said routing data of the received NSI frame is absent or empty.

6. The method of claim 1, wherein the routing data of the received NSI frame further comprises an IP address of an upstream end-point node between the wireless digital data network and an upstream network.

7. The method of claim 6, wherein the upstream end-point node is an RSU node or a static OBU node, with an uplink connection to the upstream network via a static Wi-Fi router with an uplink connection to the Internet.

8. The method of claim 1, wherein layer-2 is a data link layer of a wireless digital data network protocol.

9. The method of claim 8, wherein said method is limited to a MAC sub-layer of the data link layer of the wireless digital data network protocol.

10. The method of claim 1, wherein the IP address is an IPv4 address, or an IPv6 address, or is comprised by both IPv4 and IPv6 addresses of the same network node.

11. The method of claim 1, wherein the type of node of the current network node is an indicator on whether the current network node is an OBU node or a RSU node.

12. The method of claim 1, wherein said NSI frame further comprises motion data comprising speed and heading of the current network node.

13. The method of claim 1, wherein layer-2 is a data link layer of a wireless digital data network protocol.

14. The method of claim 13, wherein said method is limited to a MAC sub-layer of the data link layer of the wireless digital data network protocol.

15. The method of claim 14, wherein the IP address is an IPv4 address, or an IPv6 address, or is comprised by both IPv4 and IPv6 addresses of the same network node.

16. The method of claim 1, wherein the received NSI frame is broadcast periodically, at least 5 times per second.

17. A method for operating a network node of a wireless digital data network based on broadcast layer-2 periodic frames, for routing data packets in said wireless digital data network, wherein said network comprises a plurality of network nodes, wherein each network node is either a mobile node equipped with an on-board unit (OBU) node, or is a static node equipped with a road-side unit (RSU) node, said method comprising a current network node of the plurality of network nodes carrying out the following steps:
   periodically broadcasting a layer-2 Network Status Information (NSI) frame which comprises a node identifier of the current network node and a type of node of the current network node;
   receiving broadcasted NSI frames from neighbouring network nodes of the plurality of network nodes reachable by the current network node through wireless communication;
   for each received NSI frame:
      storing the received NSI frame in an entry in a NSI table (NSIT) when the received NSI frame was a first received NSI frame from a neighbouring network node,
      otherwise, when the received NSI frame was not the first received NSI frame from the neighbouring network node, updating a previously stored NSIT entry with the received NSI frame; and marking as expired or deleting any previously entered NSIT entry after a predetermined period of time has passed after receiving or updating said any previously entered NSIT entry, wherein said received NSI frame further comprises routing data which comprises a node identifier and an IP address of an uplink network node for a node broadcasting said received NSI frame, and comprises a list of the identifiers and IP addresses of the network nodes that are connected to an uplink network through the neighbouring node broadcasting said received NSI frame, herewith mentioned as linked node list, wherein the step of periodic broadcasting of said received NSI frame is initiated by the current network node when one or more of the following occurs at the current network node:

new geographic location data is available for the current network node, new motion data is available for the current network node, a Provider Service Request start (PSR start), a PSR start with an Active Connection Provider Service (ACPS), a User Service Request start (USR start), or a USR start with Active Connection User Service (ACUS), and wherein the ACPS or the ACUS comprises an Active Connection Provider Service Identifier (ACPSID).

18. The method of claim 17, wherein the ACPSID of a current connection is obtained from a Provider Service Request Table (PSRT) for a provider, or from an Available Services Table (AST) for a user.

19. An electronic network node of a wireless digital data network, wherein said network node is programmed to carry out the method of claim 1.

20. The electronic network node of claim 19, comprising a NSI management entity (NME) contained in a Medium Access Control (MAC) sub-layer of the electronic network node, said NME being programmed to carry out the method of claim 16.

21. The electronic network node of claim 19, wherein the upstream end-point node is part of a network comprising either the Internet or a network with Internet connectivity.

* * * * *